United States Patent [19]

Wilson et al.

[11] Patent Number: 4,877,562
[45] Date of Patent: Oct. 31, 1989

[54] MOLDING OF COMPOSITE PLASTICS PRODUCTS

[75] Inventors: Keith Andrew Wilson, Wymington Nr. Rushden; Ronald Ian Kliene, Pavenham, both of England

[73] Assignees: The Victaulic Company PLC, Hitchin; Tecron Industries Limited, Pavenham, both of England

[21] Appl. No.: 47,669

[22] Filed: May 8, 1987

[30] Foreign Application Priority Data

May 10, 1986 [GB] United Kingdom ................ 8611470

[51] Int. Cl.⁴ ...................... B29C 41/04; B29C 71/02; B29C 71/04
[52] U.S. Cl. ........................................ 264/22; 264/236; 264/311; 264/347; 264/249; 156/272.2; 156/275.5; 156/304.2
[58] Field of Search .................. 264/22, 25, 310, 311, 264/312, 327, 347, 236, 249; 156/272.2, 275.5, 304.2

[56] References Cited

U.S. PATENT DOCUMENTS

| | | | |
|---|---|---|---|
| 3,576,933 | 4/1971 | Bates | 264/347 |
| 3,929,538 | 12/1975 | Diebel | 264/327 |
| 3,989,787 | 11/1976 | Scott | 264/310 |
| 4,104,357 | 8/1978 | Blair | 264/310 |
| 4,115,508 | 9/1978 | Hugh | 264/310 |
| 4,117,195 | 9/1978 | Swarbrick | 264/347 |
| 4,276,247 | 6/1981 | Muenchow | 264/310 |
| 4,310,483 | 1/1982 | Dorfel | 264/310 |
| 4,330,495 | 5/1982 | Halle | 264/310 |
| 4,331,626 | 5/1982 | Colby | 264/310 |
| 4,525,516 | 6/1985 | Garcia | 264/310 |
| 4,548,779 | 10/1985 | Steinberg | 264/310 |
| 4,555,379 | 11/1985 | Maringer | 264/310 |
| 4,587,318 | 5/1986 | Inoue | 264/310 |
| 4,668,461 | 5/1987 | Needham | 264/310 |

FOREIGN PATENT DOCUMENTS 0143892 6/1985 European Pat. Off. ............ 264/310

OTHER PUBLICATIONS

Whittington's Dictionary of Plastics, 1st Edition, 1968, p. 58.

Primary Examiner—Jay H. Woo
Assistant Examiner—Jeremial F. Durkin, II
Attorney, Agent, or Firm—Kinney & Lange

[57] ABSTRACT

The invention provides a method of molding a plastics material comprising the steps of placing the material with a quantity of an appropriate catalyst in granular (including powdered) form into a hollow mold shell; suspending the mold in a mounting system enabling rotation in a plurality of directions whereby the powdered material, together with the catalyst, is able to flow over all the interior surfaces; containing the mold and mounting system within an oven and heating the mold therein while rotating the same; cooling the mold and subsequently withdrawing the molded article therefrom.

3 Claims, 1 Drawing Sheet

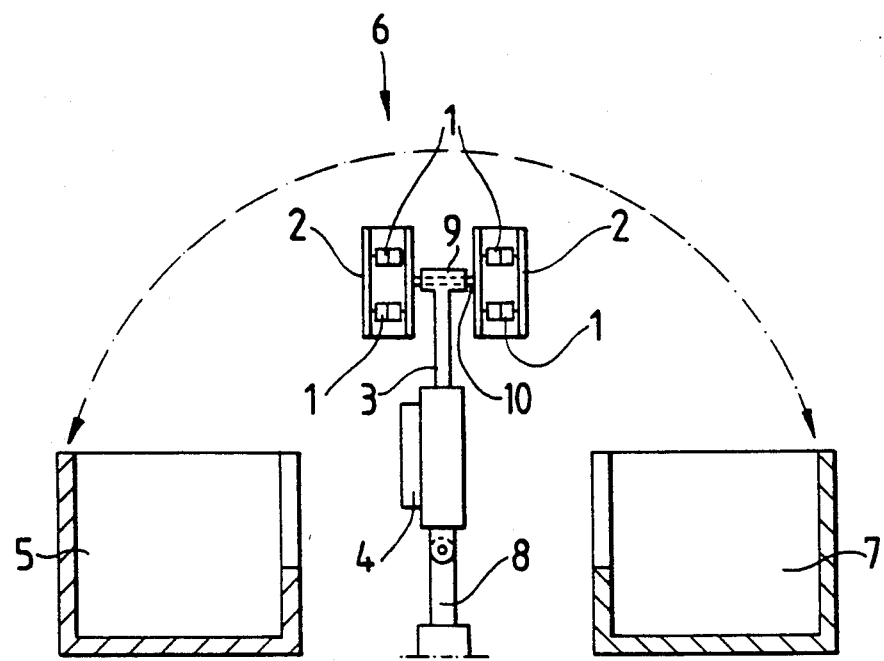

MOLDING OF COMPOSITE PLASTICS PRODUCTS

BACKGROUND OF THE INVENTION

1. Field of the Invention

This invention relates to the production of plastics products.

2. Description of the Prior Art

It is well known to mold plastics products, such as polyethylene and its co-polymers, by injection molding.

However, injection molding suffers from the disadvantage that tooling costs are relatively high and that there is a limited size range capable of injection molding.

It has also been proposed to mold thermoplastic materials by placing powdered or granular material in a hollow metal mold shell which is then suspended in a mounting system enabling rotation in one or two axes causing the powdered material to flow over all the interior surfaces of the mold shell (which have, of course, the appropriate mold impressions). The mounting system and the mold is then contained within an oven which heats the mold to the desired appropriate temperature (above the melting temperature of the plastics polymer concerned) and after a period of rotation with the oven the powdered material melts and creates a relatively even coating over the inside of the mould thus taking the mold impression. The mold is then removed from the oven for cooling and the molded article then removed from the mold.

Such a rotational system does, in certain circumstances, suffer from the drawback that high melt flow (low molecular weight) materials must be used in order to achieve satisfactory mold quality. Such materials, in practice, commonly have poor physical properties unsuitable for certain applications. In addition, materials of low or moderate melt flow give, not only poor molding quality, but also a porosity which further reduces certain physical properties. It is for this reason that the practice of crosslinking during the rotational molding process has become common. The production of high quality, tough moldings can be made possible with crosslinking. There are however associated disadvantages of higher material cost and inability of moldings, now of a thermoset nature, to be fusion welded, for example.

It is an object of the present invention to provide a moldings arrangement which overcomes or at least substantially reduces the above mentioned disadvantages and drawbacks.

SUMMARY OF THE INVENTIONS

In accordance with the invention, there is provided a method of molding a plastics material comprising the steps of placing the material with a quantity of an appropriate catalyst in granular (including powdered) form into a hollow mold shell; suspending the mold in a mounting system enabling rotation in a plurality of directions whereby the powdered material, together with the catalyst, is able to flow over all the interior surfaces; containing the mold and mounting system within an oven and heating the mold therein whilst rotating the same; cooling the mold and subsequently withdrawing the molded article therefrom.

By "an appropriate catalyst" as used herein we mean a catalyst or agent of a kind which will, during the molding process, bring about a significant controlled increase in molecular weight of the plastics material polymer, but, most important, no significant cross-linking effect. This may occur, for example, by process steps involving initially heating the rotating mold at a temperature sufficient to melt the polymer and allow it to flow into the desired molded shape, but below the activation temperature of the catalyst, and subsequently raising the temperature of the oven, when the initial molding stage is assessed to be complete, thereby activating the catalyst and creating an increase in molecular weight of the polymer. Depending upon the thickness of the molding the process may also be carried out at a single molding temperature whereby melting and activation of catalyst occurs sequentially due to the temperature gradient resulting from the poor heat transfer in the molding.

The selection of the catalyst or agent and its activation properties is, of course, important. We have found that, for example, a free radical initiator such as an organic peroxide is a suitable agent.

It is important to stress that no significant cross-linking effect is produced by the method of the present invention is that no thermosetting product, with the severe problems mentioned above, results.

In addition, in order to achieve satisfactory results, care must be taken in selecting the polymer utilized as its molecular weight distribution and level of unsaturation will greatly influence the success of the process as will the type and level of heat and ultra-violet light stabilizers. We have found certain polyethylene polymers or co-polymers to be very satisfactory.

We have found the process according to the invention to be of particular use in molding large bore fittings for polyethylene gas and water pipes, large bore pipes, inspection chambers and tanks. To produce large (300 mm and greater) fittings by injection molding, for example, would require equipment hitherto unavailable and, in any event, the tooling costs would be very high and difficult to recover on the low number of moldings required commercially. In contrast, rotational moldings of this size are a practical proposition and mold costs commercially reasonable, but such moldings often do not have the performance to match that of pipe extruded from pipe grade materials. Even if crosslinked rotational moldings are considered they may have the required performance but because they are thermosetting materials they cannot be joined by fusion welding.

In contrast, moldings manufactured according to this invention can have their performance tailored to match that of the extruded thermoplastics pipe and also retain the ability to be fusion welded into pipeline systems.

By means of the process of the invention there is only an increase in molecular weight of the polymer such that the material benefits from improved physical properties but remains thermoplastic and retains the ability for fusion welding of fittings for example to pipes, the reaction is not taken to such a level that crosslinking takes place which would result in the production of an intractable thermosetting material.

The method of the present invention may be used as a precursor or preliminary stage to further processing, e.g. subsequent irradiation or heat treatment in order further to enhance physical properties. Thus, for example, a rotationally molded pipe fitting produced according to the method of the invention, may have short lengths of pipe welded to it, and may subsequently be irradiated using either gamma ray or electron beam radiation, in order to cause cross-linking of the fitting and weld zone. In such a case, the free ends of the pipes may be protected from irradiation by, for example, lead shielding, so that they remain substantially unaffected by the radiation and may be subsequently joined to other pipes or fittings by further welding.

Such further processing may be used because it has been found, for example, that products such as pipe components of the method of the present invention can be used with conventional welding techniques for joining to pipe prior to irradiation. We believe this is difficult when not using products of the method of the invention, because rotomolded goods tend to have a much higher melt flow index than extruded pipes, thereby causing welding difficulties due to different welding temperature requirements.

BRIEF DESCRIPTION OF THE DRAWINGS

In order that the invention may be more readily understood, one embodiment thereof will now be described by way of example with reference to the accompanying drawing which illustrates schematically rotational molding equipment for use in the process of the present invention.

DETAILED DESCRIPTION OF THE PREFERRED EMBODIMENTS

Referring now to the drawing, it will be seen that a plurality of molds 1 mounted on spiders 2 are carried on arms 10 rotatable with a crosspiece 9 of a spindle 3 carrying drive motors 4. The spindle arm is pivotal on a support 8 between positions where the molds are located within a cooling chamber 5, a loading and unloading station 6, and an oven 7.

Activation of the drive motors 4 causes rotation of the spindle 3 carrying the spiders, and rotation of the spiders themselves on the arms 10 associated therewith. By this means, the molds are rotated in all three directions so that any polymer material located therein flows freely throughout the molds to cover the interior mold configuration.

By way of an example, a polyethylene homo-polymer or co-polymer of density ranging from 0.870 to 0.970 g per cc and preferably 0.93 to 0.95 g per cc and a melt flow index ranging from 1.0 to 40.0 g per 10 min (2.16 kg load weight) and preferably 5.0 to 20.0 g per 10 mins is blended with heat and ultra-violet light stabilizers, and a free radical initiator (preferably an organic peroxide or azo compound).

Alternatively, and preferably, the free radical initiation and the heat and ultra-violet light stabilizers are dispersed into the polymer by a compounding operation prior to rotomolding, by which is meant, for example, melt processing in either a single screw extruder having a mixing action, or twin screw extruder, or other mixing equipment such that the initiator and other additives are well dispersed in the polymer melt at a temperature below the activation temperature of the initiator, but above the melting point of the polymer. The material is then further processed as necessary to give a powder suitable for rotomolding.

This mixture, in powder form, is then added in the required quantities to each of the molds in the rotary molding apparatus. The molds and the associated spiders are then pivoted into the oven and rotated whilst the oven is heated to between 150° and 500° C. preferably between 200° and 400° C., for between 5 and 120 minutes preferably 20–40 minutes, depending upon the quantity of powder added to the molds and the required section thickness of the molding and the initial melt flow index of the polyethylene. After this period, the temperature of the melt in the mold within the oven is raised to between 180° and 280° C. preferably 220° to 240° C. to allow activation of the initiator, and rotary molding continued for a further 5 to 120 minutes preferably 20–40 minutes depending on the molding section thickness within the mold. Thereafter, the spindle and spider, with contained molds, is moved to the cooling chamber and allowed to cool to room temperature. After cooling, the resultant molding is found to have a melt flow index of between 1.0 and 0.01 g per 10 mins (2.16 kg load weight) and preferably between 0.4 and 0.1 g/10 minutes.

The process may also be used to produce other rotary molded hollow objects that require good physical properties and can undergo fusion welding operations, for example vehicle petrol tanks, marine craft and leisure goods and containers.

We claim:

1. A method of comprising a composite product having a welded thermoset portion, comprising:
   rotomolding a mixture of crosslinkable polymer and a catalyst in a mold under conditions insufficient to cause significant crosslinking of the polymer, wherein the polymer remains thermoplastic in nature;
   cooling the mold and subsequently withdrawing a molded thermoplastic article therefrom;
   providing a second thermoplastic article;
   welding the molded thermoplastic article to the second thermoplastic article; and
   exposing the welded composite product to crosslinking conditions to convert a portion of the material from a thermoplastic material to a thermoset material.

2. The method of claim 1 wherein the crosslinking conditions include irradiation.

3. The method of claim 1 wherein the crosslinking conditions include a temperature sufficient to activate the catalyst.

* * * * *

UNITED STATES PATENT AND TRADEMARK OFFICE
CERTIFICATE OF CORRECTION

PATENT NO. : 4,877,562
DATED : October 31, 1989
INVENTOR(S) : Keith Andrew Wilson It is certified that error appears in the above-identified patent and that said Letters Patent is hereby corrected as shown below:

Column 4, line 34, after "a method of" delete "comprising" and insert --forming--.

Signed and Sealed this

Eighth Day of January, 1991

Attest:

HARRY F. MANBECK, JR.

*Attesting Officer*  *Commissioner of Patents and Trademarks*